United States Patent [19]

Miyamoto

[11] Patent Number: 4,459,500
[45] Date of Patent: Jul. 10, 1984

[54] MAGNETIC FIELD POLE ASSEMBLY

[75] Inventor: Toshinobu Miyamoto, Osaka, Japan

[73] Assignee: Sumitomo Special Metal Company Limited, Osaka, Japan

[21] Appl. No.: 378,273

[22] Filed: May 14, 1982

[30] Foreign Application Priority Data

Oct. 15, 1981 [JP] Japan .................... 56-153766

[51] Int. Cl.$^3$ ............................................. H02K 21/28
[52] U.S. Cl. ..................................................... 310/154
[58] Field of Search .................................. 310/46, 154

[56] References Cited

U.S. PATENT DOCUMENTS 3,693,037  9/1972  West ............................ 310/154
3,836,802  9/1974  Parker ......................... 310/46 X Primary Examiner—Donovan F. Duggan
Attorney, Agent, or Firm—Watson, Cole, Grindle & Watson

[57] ABSTRACT

A magnetic field pole assembly for a direct-current motor comprises a nonmagnetic support member, a plurality of even pole pieces disposed in the support member and angularly spaced in symmetrical relationship around a central axis of the support member, a pair of permanent magnets mounted one on each side of each pole piece and having like plarities confronting each other across the pole piece, and yokes disposed between adjacent pole pieces and connected to and between those adjacent permanent magnets which are mounted on the adjacent pole pieces. Each of the permanent magnets is in the form of a plate magnetized in the direction of plate thickness and having one magnetic pole surface secured to a side of one of the pole pieces.

20 Claims, 6 Drawing Figures

MAGNETIC FIELD POLE ASSEMBLY

BACKGROUND OF THE INVENTION

1. Field of the Invention:

The present invention relates to a magnetic field pole assembly for generating a magnetic field in a DC motor.

2. Description of the Prior Art:

There has heretofore been known a magnetic field pole assembly of the type described which, as shown in FIG. 1 of the accompanying drawings, comprises a tubular yoke 1 of ferromagnetic material and a plurality of radial permanent magnets 2 mounted in angularly spaced relation in the tubular yoke 1 and each having a pole piece on a distal end thereof, with a cylindrical space 4 defined jointly by the permanent magnets 2 centrally in the tubular yoke 1 for receiving therein a rotor (not shown), there being magnetic paths $M_1$ formed by the yoke 1 and the permanent magnets 2. The permanent magnets 2 are normally composed of an alnico alloy (4 alnico 5-7). As is well known, the alnico alloy consists chiefly of cobalt, iron and other materials, and is so expensive that only the permanent magnets take about 70% of the cost of the magnetic field pole assembly. The alnico magnets cannot be shaped to contour with high precision.

In order to gain proper magnetic flux distribution in the cylindrical space 4, it is necessary that adjacent permanent magnets be angularly spaced equal intervals around the central axis of the tubular yoke 1. The permanent magnets 2 should be affixed to the pole pieces 3 and the tubular yoke 1 in intimate contact therewith for the formation of the magnetic paths $M_1$. These requirements result in a high precision required of the shape and dimensions of the permanent magnets 2. There is also required a high degree of concentricity between the magnetic circuit and the rotor (not illustrated) inserted in the cylindrical space 4. To obtain a desired dimensional accuracy, therefore, the pole pieces 3 should be finished on their inner surfaces 5 after the magnetic field pole assembly has been put together.

Another magnetic field pole assembly has been known which is designed to meet the foregoing requirements, particularly the economical requirement. The magnetic field pole assembly includes, as shown in FIG. 2, a tubular frame 6, a plurality of pole pieces 3 constructed of laminated sheets of silicon steel and mounted in angularly spaced relation in the frame 6 with a cetral cylindrical space 4 defined by the pole pieces 3, and a plurality of permanent magnets 2 each in the form of a rectangular parallelopiped located between adjacent ones of the pole pieces 3. The permanent magnets 2 have like polarities confronting each other to form alternate polarities on the inner surfaces 5 of the pole pieces 3 and magnetic paths $M_2$. With such a magnetic field pole assembly, the permanent magnets 2 can have wider magnetic pole surfaces (effective cross-sectional areas) and hence can increase the efficiency of the magnetic pole assembly, an arrangement which allows the use of less costly ceramic magnets as well as more expensive alnico magnets.

A proper magnetic flux distribution (proper magnetic field balancing) in the cylindrical space 4 requires that adjacent pole pieces 3 be arranged at equal angular intervals around the central axis of the tubular frame 6, and the pole pieces 3 and the permanent magnets 2 form a complete cylindrical body. The magnetic field balancing in the cylindrical space 4 would be impaired if there were gaps between the pole pieces 3 and the permanent magnets 2, and also if the cylindrical body had an increased out-of-roundness. Therefore, the components of the magnetic field pole assembly need to have a high dimensional accuracy and to be precision assembled. As with the magnetic field pole assembly as shown in FIG. 1, there should be a high concentricity between the magnetic circuit and the rotor (not shown) placed in the cylindrical space 4, and the inner pole piece surfaces 5 are required to be finished after the magnetic field pole assembly has been assembled for a sufficient degree of dimensional accuracy.

While the magnetic field pole assembly illustrated in FIG. 2 can incorporate ceramic magnets, they fail to produce a compatible DC motor magnetic field as compared with the magnetic field pole assembly as shown in FIG. 1, which has alnico magnets assembled therein and is of the same dimensions (outside diameter and height) as those of the assembly of FIG. 2.

SUMMARY OF THE INVENTION

It is an object of the present invention to provide a magnetic field pole assembly for DC motors such as coreless stepping motors of the high-torque low-inertia type, the magnetic field pole assembly incorporating therein less costly ceramic magnets rather than expensive alnico magnets.

Another object of the present invention is to provide a magnetic field pole assembly for use in all kinds of DC motors having a rotor with an iron core as well as coreless stepping motors.

According to the present invention, a magnetic field pole assembly for DC motors comprise a nonmagnetic support means, a plurality of even pole pieces arranged to be disposed on the support means and angularly spaced in symmetrical relation around a central axis of the support means, a pair of permanent magnets mounted one on each side of each pole piece and having like polarities confronting each other across the pole piece, and a plurality of yokes disposed between adjacent pole pieces and connected to and between those adjacent permanent magnets which are mounted on the adjacent pole pieces.

The above and other objects, features, and advantages of the present invention will become more apparent from the following description when taken in conjunction with the accompanying drawings in which preferred embodiments of the invention are shown by way of illustrative example.

DETAILED DESCRIPTION OF THE PREFERRED EMBODIMENTS

Figure 1:
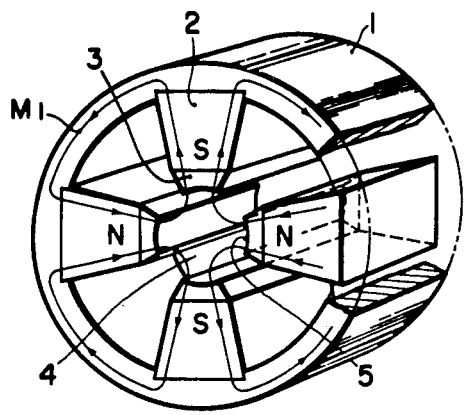
FIG. 1 is a perspective view, partly cut away, of a conventional magnetic field pole assembly.
Figure 2:
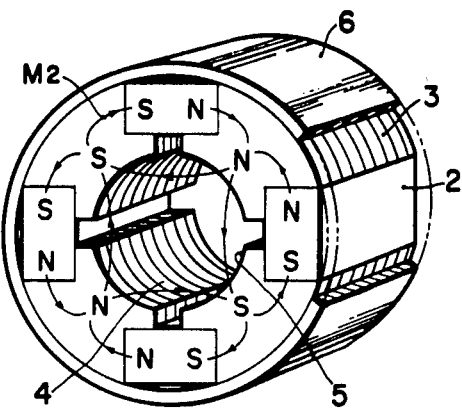
FIG. 2 is a view similar to FIG. 1, showing another prior magnetic field pole assembly.

The present invention will now be described with reference to FIGS. 3 through 6 which show various embodiments of the invention. Like or corresponding parts are denoted by like or corresponding reference characters throughout the views.

Figure 3:
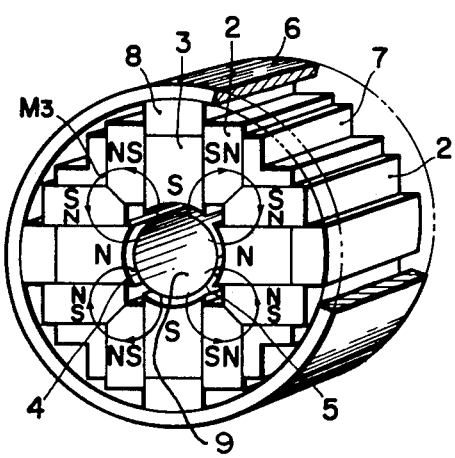
FIG. 3 is a perspective view, with parts broken away, of a magnetic field pole assembly according to an embodiment of the present invention.

As shown in FIG. 3, a cylindrical or polygonal tubular frame 6 of nonmagnetic material such as plastics or synthetic rubber houses therein four pole pieces 3 extending radially and angularly spaced in symmetrical relationship around a central axis of the frame 6. Spacers 8 of nonmagnetic material are interposed between the frame 6 and the pole pieces 3 to position the latter for the best efficiency of the magnetic circuit produced. While the pole pieces 3 are shown as being four in number, they may be even in number such as two or eight. The pole pieces 3 are secured at their radially outward end faces to an inner surface of the frame 6 by bolts with the spacers 8 sandwiched therebetween. Each of the pole pieces 3 has a radially inward end face 5 which is arcuately shaped such that the end faces 5 of the pole pieces 3 jointly define a cylindrical space 4 which is coaxial with the central axis of the frame 6 and houses a rotor (not shown) therein.

A pair of plate-shaped permanent magnets 2, 2 which are magnetized as shown in FIG. 3 are mounted one on each side of each of the pole pieces 3. One of the magnetic pole surfaces of each of the permanent magnets 2 is bonded with adhesive to one side face of a corrseponding one of the pole pieces 3. An L-shaped yoke 7 is bonded with adhesive to the other magnetic pole surface of adjacent permanent magnets 2 which are remote from the pole pieces 3 to thereby magnetically couple the adjacent permanent magnets 2 with each other. To provide alternately different polarities on the arcuate end faces 5 of the pole pieces 3, each of the pole pieces 3 is sandwiched between like polarities of the permanent magnets 2 which confront each other across each pole piece 3. The polarities of the permanent magnets 2 which face one of the pole pieces 3 are different from those of the permanent magnets 2 which face an adjacent one of the pole pieces 3, and are the same as those of the permanent magnets 2 which confront another pole piece 3 that is diametrically opposite to one of the pole pieces 3.

Each of the pole pieces 3 is of such a size that it is substantially coextensive in size with associated permanent magnets 2 to prevent generation of an increased leakage magnetic flux, which would otherwise result from an oversize pole piece. The pole pieces 3, the permanent magnets 2, and the yokes 7 thus assembled together jointly constitute magnetic paths $M_3$.

The permanent magnets 2 may comprise ceramic magnets which are of a high magnetic circuit efficiency and are available less costly since the illustrated construction allows wider magnetic pole surfaces (wider effective cross-sectional areas) for the permanent magnets. With the magnetic field pole assembly shown, the permanent magnets 2 can be flat in shape and can be of a high coercive force and a low residual magnetic flux density. Therefore, ceramic magnets are most suitable for use in the magnetic field pole assembly. Permanent magnets of a high coercive force, other than ceramic magnets, may comprise rare earth cobalt magnets. Where the rare earth cobalt magnets are employed, the magnetic field pole assembly can be smaller in size.

The tubular frame 6 may be made of aluminum by die casting with the pole pieces 3 embedded therein, or may be molded of plastics in a manner to hold the pole pieces 3, the permanent magnets 2 and the yokes 7. The pole pieces 3 and the yokes 7 may be in the form of blocks of iron or steel, or may comprise laminated sheets of silicon steel.

The tubular frame 6 and the spacers 8 serve to hold the pole pieces 3 securely in position, and do not constitute indispensable components for the magnetic field pole assembly.

A comparison was made between a magnetic field pole assembly having alnico magnets for use in a DC motor as shown in FIG. 1 and a magnetic field pole assembly having ceramic magnets as shown in FIG. 3 according to the present invention. The outside diameter of the assemblies was 152 mm. The alnico magnets had a residual magnetic flux density of $Br = 13.5$ (kG) (1.35(T) ), a coercive form of $Hc = 740$ (Oe) (58.9 (kA/m)), and a maximum energy product of $(BH)max = 7.55$ (MGOe) (60.1 (KJ/m$^3$)). The ceramic magnets had a residual magnetic flux density of $Br = 4.5$ (kG) (0.45 (T)), a coercive force of $Hc = 3,000$ (Oe) (238.8 (kA/m)), and maximum energy product of $(BH)max = 4.8$ (MGOe) (38.2 (KJ/m$^3$) ).

A magnetic field generated in the cylindrical space 4 in the magnetic field pole assembly according to the present invention had characteristics that are equal to or better than those of the conventional magnetic field pole assembly. The characteristics of a DC motor which incorporated the magnetic field pole assembly of the invention were equal to or better than those of a DC motor with the prior magnetic field pole assembly incorporated therein.

Figure 4:
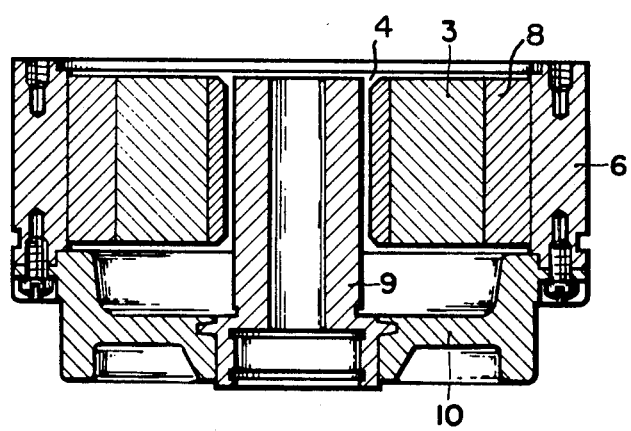
FIG. 4 is a cross-sectional view of the magnetic field pole assembly as incorporated in a coreless DC motor.

A DC motor having a magnetic field pole assembly of the present invention will be described with reference to FIG. 4. FIG. 4 shows a coreless DC motor which comprises a cylindrical flux return member 9 of ferromagnetic material disposed between the cylindrical space 4 coaxially with the magnetic field pole assembly with a clearance left between the flux return member 9 and the pole pieces 3. The flux return member 9 has one end projecting axially out of an end cover 10 at a center thereof which closes off one axial opening in the tubular frame 6. A rotor (not shown) with no iron core is disposed in the clearance defined between the flux return member 9 and the pole pieces 3. With respect to FIG. 3 magnetic path $M_3$ extends from a pole piece 3 to the flux return member 9 to an adjacent pole piece 3 to permanent magnet 2 mounted thereon to a yoke 7 bonded to the permanent magnet 2 to another permanent magnet 2 attached to the yoke 7 and back to the first-mentioned pole piece 3.

An ordinary DC motor includes a rotor having an iron core and a winding and disposed in the cylindrical space 4 coaxially with the magnetic field pole assembly with a clearance defined between the rotor and the pole pieces 3 as shown in FIG. 1. A magnetic path $M_2$ extends from a pole piece 3 to the iron core to an adjacent pole piece 3 to a permanent magnet 2 mounted on the last-mentioned pole piece 3 to a yoke attached to the permanent magnet 2 to another permanent magnet 2 and back to the first-mentioned pole piece 3.

Where a magnetic field pole assembly with ceramic magnets having the foregoing characteristics and the above assembly outside diameter was incorporated in a coreless DC motor in which the diameter of the cylindrical spaced defined by the inner surfaces 5 is 29.62 mm and the flux return member 9 has a diameter of 26.70 mm, the magnetic flux density at the center of a clearance Lg=1.46 mm defined between the inner surfaces 5 and the outer periphery of the flux return member 9 was 12,000 gauss.

Figure 5:
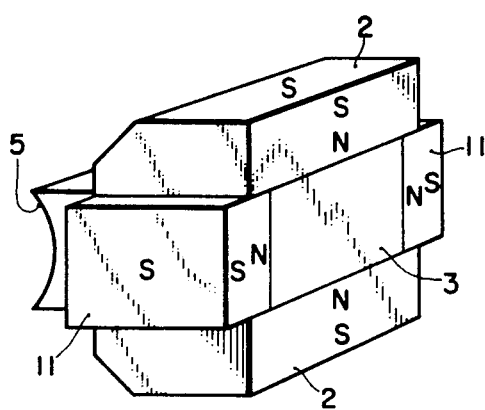
FIG. 5 is an enlarged perspective view of a pole piece and associated permanent magnets in a magnetic field pole assembly according to another embodiment of the present invention.

According to another embodiment shown in FIG. 5, a pair of auxiliary magnets 11, 11 are mounted on axial end surfaces of a pole piece 3 to reduce a magnetic flux leakage from the pole piece 3 for increased magnetic forces. With this arrangement, the apparent volume of the magnets can be increased and the pole piece 3 is prevented from being demagnetized. More specifically, FIG. 5 shows a positional relationship between the pole piece 3, permanent magnets 2 and repulsive auxiliary magnets 11 which are disposed around the pole piece 3. A north-seeking pole N appears on the inner surface 5 of the pole piece 3.

The repulsive auxiliary magnet 11 may be mounted on at least one axial end surface of the pole piece 3. It is necessary that the magnetic pole surface of the auxiliary magnet 11 which is in intimate contact with the pole piece 3 have a polarity identical to that on the inner surface 5 of the pole piece 3. Since the auxiliary magnet 11 is flatter than the permanent magnet 2, the former has a stronger coercive force than that of the latter.

Figure 6:
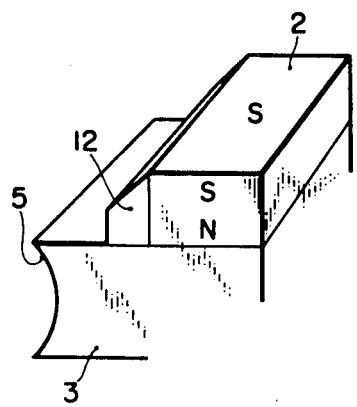
FIG. 6 is an enlarged perspective view of a permanent magnet combined with an auxiliary magnet according to still another embodiment of the invention.

FIG. 6 illustrates still another embodiment in which a permanent magnet 2 has a frontal tapered portion that is composed of an auxiliary magnet 12 having a high coercive force. More specifically, a tapered portion of the permanent magnet 2 has a lower operating point than that of a flat portion thereof, and tends to be demagnetized due to a magnetic flux leakage at a distal end of the pole piece 3 and mutual demagnetization of permanent magnets 2. To cope with such a problem, the tapered portion is composed of an auxiliary magnet which has a high coercive force than that of the permanent magnet 2.

It is preferable as described that the permanent magnets comprise ceramic magnets having a high magnetic flux density and high energy. The repulsive auxiliary magnets 11 shown in FIG. 5 and the auxiliary magnet 12 for preventing demagnetization shown in FIG. 6 should preferably be composed of ceramic magnets of a high coercive force. As an example, the repulsive auxiliary magnet had Br=4.0 (kG (0.4 (T)), Hc=3,200 (Oe) (254.7 (kA/m)), (BH)max=3.5 (MGOe) (27.9 (KJ/m$^3$)), and the auxiliary magnet for preventing demagnetization had Br=4.0 (kG) (0.4 (T) ), Hc = 3,500 (Oe) (278.6 (KA/m)), and (BH)max=3.6 (MGOe) (28.7 (KJ/m$^3$)). With the above improvements, the field magnet generated increased by about 10%. An example incorporating the embodiments shown in FIGS. 5 and 6 produced better results.

With the magnetic field pole assembly thus constructed, the yokes 7 allow the magnetic paths $M_3$ (FIG. 3) to be formed through the pole pieces 3 and the permanent magnets 2 independently mounted thereon to develop magnetic poles on the inner surfaces 5 of the pole pieces 3, whereby a magnetic field can be generated in the cylindrical space 4 surrounded by the magnetic pole surfaces 5 to drive the rotor (not shown) in the space 4 to rotate about its own axis. Since the permanent magnets 2 are joined to the sides of the pole pieces 3, the permanent magnets 2 have wider magnetic pole surfaces for utilization of the magnets 2 to capacity, an arrangement which permits less costly ceramic magnets to be put to use and also permits a stronger magnetic field to be produced. One permanent magnet does not extend across two pole pieces, so that magnetic field balancing will not be adversely affected if the permanent magnets are positionally displaced, and the permanent magnets can be assembled with ease.

The magnetic field pole assembly according to the present invention thus allows use of ceramic permanent magnets, and is so constructed that it can be assembled easily and speedily without involving an increased expenditure of time and labor, which would be required in assembling conventional magnetic field pole assemblies incorporating ceramic magnets. The magnetic field pole assembly thus achieves a large reduction in the cost (about 40% or more ) through the inexpensive permanent magnets used and the relative ease with which the assembly is put together. Therefore, the cost of manufacture of DC motors can also be reduced.

Although certain preferred embodiments have been shown and described in detail, it should be understood that various changes and modifications may be made therein without departing from the scope of the appended claims.

What is claimed is:

1. A magnetic field pole assembly for a directcurrent motor, comprising:
   a non-magnetic support means;
   four or more even number of pole pieces angularly spaced in symmetrical relationship around a central axis of said support means and attached thereto;
   a number of permanent magnets equal in number to twice said even number of pole pieces, each permanent magnet having a tapered end portion and one permanent magnet being attached to a respective opposite side of a respective pole piece such that like polarities of opposing permanent magnets on each pole piece are in confronting relationship and the tapered end portions of respective permanent magnets between adjacent pole pieces are in confronting relationship;
   a number of yokes equal in number to said even number of pole pieces and each including a pair of leg members, each respective yoke extending between adjacent pole pieces with each leg member being attached to a respective one of the permanent magnets attached to said adjacent pole pieces;
   a non-magnetic end cover for closing and opening formed in the axial direction of said non-magnetic support means; and
   a ferromagnetic cylindrical flux return member embedded to project axially from the center of said end cover and spaced from the inward end faces of said pole pieces.

2. A magnetic field pole assembly according to claim 1, wherein said support means is composed of a substantially cylindrical frame made of die cast aluminum.

3. A magnetic field pole assembly according to claim 2, wherein said substantially cylindrical frame is in the form of a polygonal tubing.

4. A magnetic field pole assembly according to claim 2, wherein each of the pole pieces is embedded in said non-magnetic support means.

5. A magnetic field pole assembly according to claim 1, wherein said pole pieces and yoke are made of iron or steel.

6. A magnetic field pole assembly according to claim 1, wherein said pole pieces and yoke are composed of silicon steel plates laminated in the axial direction of the magnetic pole assembly.

7. A magnetic field pole assembly according to claim 1, wherein said pole pieces are four in number.

8. A magnetic field pole assembly according to claim 7, wherein each of said yokes is L-shaped.

9. A magnetic field pole assembly according to claim 1, wherein each of said permanent magnets is made of ceramic magnetic material.

10. A magnetic field pole assembly according to claim 1, wherein each of said permanent magnets is in the form of a plate magnetized in the direction of plate thickness and having one magnetic pole surface secured to said respective opposite side of a respective pole piece.

11. A magnetic field pole assembly according to claim 1, further comprising at least one auxiliary magnet disposed adjacent to each of said permanent magnets.

12. A magnetic field pole assembly according to claim 11, wherein each of said at least one auxiliary magnet has a coercive force higher than that of each permanent magnet and is attached at the radially inward end of each of said permanent magnets.

13. A magnetic field pole assembly according to claim 11, wherein said at least one auxiliary magnet is secured to at least one axial end face of each pole piece.

14. A magnetic field pole assembly according to claim 13, wherein each of said at least one auxiliary magnet has a coercive force higher than that of each permanent magnet.

15. A magnetic field pole assembly according to claim 11, including a number of first and second auxiliary magnets, said first auxiliary magnets having a coercive force higher than that of each permanent magnet and at least one first auxiliary magnet being attached at the radially inward end of each permanent magnet and at least one second auxiliary magnet being secured to at least one axial end face of each pole piece.

16. A magnetic field pole assembly according to claim 2, wherein said substantially cylindrical frame is in the form of a cylindrical tubing.

17. A magnetic field pole assembly according to claim 1, wherein said support means is made of plastic material.

18. A magnetic field pole assembly according to claim 17, wherein each of said pole pieces, permanent magnets and yokes are retained in the plastic material of said non-magnetic support means.

19. A magnetic field pole assembly according to claim 1, wherein said support means is made of synthetic rubber.

20. A magnetic field pole assembly according to claim 1, wherein each of said permanent magnets is made of rare earth magnetic material.

* * * * *